(12) United States Patent
Itoh et al.

(10) Patent No.: US 9,822,250 B2
(45) Date of Patent: Nov. 21, 2017

(54) METHOD FOR PRODUCING POLYESTER RESIN COMPOSITION

(71) Applicant: NISSHINBO CHEMICAL INC., Tokyo (JP)

(72) Inventors: Takahiko Itoh, Chiba (JP); Yoshihiro Yamazaki, Chiba (JP); Akira Taniguchi, Chiba (JP); Saori Kotani, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 0 days.

(21) Appl. No.: 14/762,087

(22) PCT Filed: Jan. 21, 2014

(86) PCT No.: PCT/JP2014/051154
§ 371 (c)(1),
(2) Date: Jul. 20, 2015

(87) PCT Pub. No.: WO2014/112651
PCT Pub. Date: Jul. 24, 2014

(65) Prior Publication Data
US 2015/0353725 A1 Dec. 10, 2015

(30) Foreign Application Priority Data

Jan. 21, 2013 (JP) ................................. 2013-008776

(51) Int. Cl.
| C08L 67/02 | (2006.01) |
| C08L 79/00 | (2006.01) |
| C08L 67/00 | (2006.01) |
| C08J 3/00 | (2006.01) |
| C08J 3/20 | (2006.01) |
| C08K 5/29 | (2006.01) |

(52) U.S. Cl.
CPC ............... *C08L 67/02* (2013.01); *C08J 3/005* (2013.01); *C08J 3/201* (2013.01); *C08J 3/203* (2013.01); *C08L 67/00* (2013.01); *C08L 79/00* (2013.01); *C08J 2367/02* (2013.01); *C08J 2367/04* (2013.01); *C08J 2479/08* (2013.01); *C08K 5/29* (2013.01)

(58) Field of Classification Search
CPC .......... C08L 67/02; C08L 69/00; C08L 67/00; C08J 3/005
See application file for complete search history.

(56) References Cited

U.S. PATENT DOCUMENTS

| 5,889,096 A | 3/1999 | Imashiro et al. | |
| 8,232,354 B2 | 7/2012 | Kishimoto et al. | |
| 2005/0032947 A1 | 2/2005 | Takahashi et al. | |
| 2005/0054755 A1* | 3/2005 | Takahashi | C08K 5/1345 |
| | | | 524/115 |
| 2005/0233142 A1* | 10/2005 | Takahashi | D01F 1/10 |
| | | | 428/364 |
| 2009/0318628 A1 | 12/2009 | Tanaka et al. | |
| 2010/0197842 A1 | 8/2010 | Kamikawa | |
| 2011/0114172 A1 | 5/2011 | Nakada et al. | |
| 2012/0028063 A1* | 2/2012 | Sakata | B29C 65/1635 |
| | | | 428/480 |
| 2012/0101200 A1 | 4/2012 | Fruth et al. | |
| 2012/0165447 A1 | 6/2012 | Fruth et al. | |
| 2012/0192944 A1* | 8/2012 | Aoyama | H01L 31/048 |
| | | | 136/256 |
| 2013/0012631 A1 | 1/2013 | Serizawa et al. | |
| 2015/0218731 A1 | 8/2015 | Mitadera et al. | |

FOREIGN PATENT DOCUMENTS

| EP | 2947119 A1 | 11/2015 |
| EP | 2980156 A1 | 2/2016 |
| JP | 2007-231194 A | 9/2007 |
| JP | 2010-006869 A | 1/2010 |
| JP | 2011-168756 A | 9/2011 |
| JP | 2011-195668 A | 10/2011 |
| JP | 2012-036391 A | 2/2012 |
| JP | 2012-036392 A | 2/2012 |
| WO | WO 2008/010355 A1 | 1/2008 |
| WO | WO 2009/041054 A1 | 4/2009 |
| WO | WO 2010/018662 A1 | 2/2010 |
| WO | WO 2011/122080 A1 | 10/2011 |
| WO | WO 2012/128006 A1 | 9/2012 |

OTHER PUBLICATIONS

Machine translation of JP 2012/128006. Sep. 2012.*
International Search Report and Written Opinion of the International Searching Authority (Forms PCT/ISA/237 and PCT/ISA/210), dated Apr. 22, 2014, for International Application No. PCT/JP2014/051152, with an English translation of the Written Opinion.
International Search Report issued in PCT/JP2014/051154 dated Apr. 22, 2014.
US Office Action dated Nov. 25, 2015 for U.S. Appl. No. 14/762,100.
Office Action issued in the corresponding Chinese Patent Application No. 201480005349.2 on May 3, 2016.
Extended European Search Report dated Aug. 2, 2016, for European Application No. 14740811.6.
Extended European Search Report dated Jul. 21, 216, for European Applicarion No. 14740279.6.
English translation of Chinese Office Action issued in the corresponding Chinese Patent Application No. 201480005349.2 dated Dec. 20, 2016 (6 pages).

(Continued)

Primary Examiner — John Uselding
(74) Attorney, Agent, or Firm — Birch, Stewart, Kolasch & Birch, LLP

(57) ABSTRACT

The present invention relates to a process for producing a polyester resin composition, including the step of mixing a polyester resin (A), an aromatic carbodiimide (B) and an aliphatic polycarbodiimide (C) at a temperature not lower than a melting temperature of the polyester resin, in which the polyester resin (A) and the aromatic carbodiimide (B) are mixed in the presence of the aliphatic polycarbodiimide (C).

3 Claims, No Drawings

(56) References Cited

OTHER PUBLICATIONS

English translation of Yang, "Green Plastics Polylactic Acid," Chemical Industry Press, dated Sep. 30, 2007, pp. 2-6 (9 pages).

* cited by examiner

METHOD FOR PRODUCING POLYESTER RESIN COMPOSITION

TECHNICAL FIELD

The present invention relates to a process for producing a polyester resin composition which is capable of suppressing generation of a highly toxic gas upon production of the polyester resin composition.

BACKGROUND ART

Polyester resins have been extensively used in the application fields such as films and sheets because they are excellent in transparency, mechanical strength, melting stability, solvent resistance and recyclability. Further, in recent years, the polyester resins have also been used for housings of domestic appliances or OA equipments.

However, the polyester resins tend to readily undergo hydrolysis as compared to conventional general-purpose resins. For this reason, for the purpose of improving a hydrolysis resistance of the polyester resins, an aromatic carbodiimide has been conventionally added thereto.

For example, PTL1 discloses an aliphatic polyester resin composition prepared by compounding an aromatic monocarbodiimide compound into an aliphatic polyester resin such as a polylactic acid, which is excellent in hydrolysis resistance, and a process for producing the aliphatic polyester resin composition.

CITATION LIST

Patent Literature

PTL1: WO 2008/010355A

SUMMARY OF INVENTION

Technical Problem

In the polyester resin composition disclosed in PTL1 which is obtained by mixing the polyester resin and the aromatic carbodiimide, it is possible to suppress hydrolysis of the polyester resin. However, when mixing the polyester resin and the aromatic carbodiimide, there tends to occur such a problem that if these compounds are mixed at a temperature not lower than a melting temperature of the polyester resin, a carboxy group of the polyester resin is reacted with a carbodiimide group of the aromatic monocarbodiimide during the mixing to cause decomposition of the aromatic monocarbodiimide, so that a large amount of a highly toxic gas derived from an isocyanate group is generated, thereby causing deterioration in working environments and safety.

The present invention has been accomplished in view of the above conventional problem. Thus, an object of the present invention is to provide a process for producing a polyester resin composition which is capable of suppressing generation of a highly toxic gas when mixing a polyester resin and an aromatic carbodiimide at a temperature not lower than a melting temperature of the polyester resin.

Solution to Problem

As a result of the present inventors' earnest and intense studies on a method for suppressing generation of the highly toxic gas, it has been found that when mixing a polyester resin and an aromatic carbodiimide in the presence of an aliphatic polycarbodiimide, it is possible to prevent generation of a highly toxic decomposed gas derived from the aromatic carbodiimide, to a considerable extent.

Thus, in an aspect of the present invention, there is provided a process for producing a polyester resin composition, which includes the step of mixing a polyester resin (A), an aromatic carbodiimide (B) and an aliphatic polycarbodiimide (C) at a temperature not lower than a melting temperature of the polyester resin, the polyester resin (A) and the aromatic carbodiimide (B) being mixed in the presence of the aliphatic polycarbodiimide (C).

Advantageous Effects of Invention

According to the present invention, it is possible to provide a process for producing a polyester resin composition which is capable of suppressing generation of a highly toxic gas when mixing a polyester resin and an aromatic carbodiimide at a temperature not lower than a melting temperature of the polyester resin, in order to improve a hydrolysis stability of the polyester resin.

DESCRIPTION OF EMBODIMENTS

The present invention relates to a process for producing a polyester resin composition, including the step of mixing a polyester resin (A), an aromatic carbodiimide (B) and an aliphatic polycarbodiimide (C) at a temperature not lower than a melting temperature of the polyester resin, in which the polyester resin (A) and the aromatic carbodiimide (B) are mixed in the presence of the aliphatic polycarbodiimide (C).

According to the production process of the present invention, since the polyester resin (A) and the aromatic carbodiimide (B) are mixed in the presence of the aliphatic polycarbodiimide (C), a carboxy group present in the polyester resin (A) is preferentially reacted with a carbodiimide group of the aliphatic polycarbodiimide (C) having a high reactivity, so that substantially a whole amount of the aromatic carbodiimide (B) remains as such in the polyester resin (A) without reacting with the carboxy group of the polyester resin (A), and further since the aliphatic polycarbodiimide (C) is free from decomposition by the reaction with the polyester resin (A), generation of a large amount of a highly toxic gas can be inhibited. Therefore, it is possible to effectively suppress generation of a highly toxic gas derived from the aromatic carbodiimide.

As the specific mixing method concerning the mixing order of the respective components, there may be mentioned a method in which the components (A) is mixed with the component (B) and the component (C) at the same time, a method in which after mixing the components (A) and (C), the resulting mixture is mixed with the component (B), and a method in which after mixing the components (A) and (C) and mixing the components (B) and (C), respectively, the resulting mixtures are mixed together.

Further, there may also be used a method in which a master batch prepared by compounding the component (B) or the component (C) solely or both the component (B) and the component (C) into the component (A) is used and mixed in place of the component (B) or the component (C).

Of these methods, from the viewpoint of a high production efficiency, preferred are the method in which the components (A) is mixed with the component (B) and the component (C) at the same time, and the method in which after mixing the components (A) and (C), the resulting mixture is mixed with the component (B), and more preferred is the method in which after mixing the components (A) and (C), the resulting mixture is mixed with the component (B).

<Polyester Resin (A)>

Examples of the polyester resin (A) used in the present invention include at least one polyester resin selected from the group consisting of polyethylene terephthalate (hereinafter also referred to as "PET"), polybutylene succinate (a polyester resin produced from an aliphatic polycarboxylic acid and an aliphatic polyol; hereinafter also referred to as "PBS"), polybutylene succinate adipate (hereinafter also referred to as "PBSA"), polybutylene adipate terephthalate (hereinafter also referred to as "PBAT"), a polyhydroxyalkanoic acid (a polyester resin produced from 3-hydroxyalkanoic acid; hereinafter also referred to as "PHA"), a polylactic acid (hereinafter also referred to as "PLA"), polybutylene terephthalate, polyethylene naphthalate, a polyarylate, a polycarbonate, an ethylene terephthalate-isophthalate copolymer and a polyarylate.

Of these polyester resins, preferred are polyethylene terephthalate, polybutylene succinate, a polyhydroxyalkanoic acid and a polylactic acid.

<Aromatic Carbodiimide (B)>

The aromatic carbodiimide (B) is not particularly limited as long as the carbodiimide contains a carbodiimide group directly bonded to an aromatic ring, and examples of the aromatic carbodiimide (B) include an aromatic monocarbodiimide and an aromatic polycarbodiimide.

As the aromatic monocarbodiimide, there may be mentioned those compounds having a basic structure represented by the following general formula (I):

$$R-N=C=N-R' \quad (I)$$

wherein R and R' are each independently an aromatic group.

Specific examples of the aromatic monocarbodiimide include at least one compound selected from the group consisting of diphenyl carbodiimide, bis(methylphenyl)carbodiimide, bis(methoxyphenyl)carbodiimide, bis(nitrophenyl)carbodiimide, bis(dimethylphenyl)carbodiimide, bis(diisopropylphenyl)carbodiimide, bis(di-tert-butylphenyl)carbodiimide and bis(triphenylsilyl)carbodiimide.

Of these compounds, from the viewpoint of improving a hydrolysis resistance of the polyester resin, preferred is bis(diisopropylphenyl)carbodiimide.

As the aromatic polycarbodiimide, there may be mentioned those compounds having a basic structure represented by the following general formula (II):

(II)

wherein n is an integer of 2 or more, and R is an aromatic group.

The aromatic polycarbodiimide may be synthesized, for example, by subjecting various organic diisocyanates to decarboxylation condensation reaction by using an organic phosphorus-based compound or an organic metal compound as a catalyst.

Examples of the organic diisocyanates used as a raw material for production of the aromatic polycarbodiimide include at least one compound selected from the group consisting of 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, 3,3',5,5'-tetraisopropyl biphenyl-4,4'-diisocyanate and 1,3,5-triisopropylbenzene-2,4-diisocyanate.

Of these compounds, from the viewpoints of ensuring a high safety and imparting an excellent hydrolysis resistance to the polyester resin composition, preferred is 1,3,5-triisopropylbenzene-2,4-diisocyanate.

The amount of the aromatic carbodiimide (B) used in the polyester resin composition is preferably from 0.1 to 10 parts by mass, more preferably from 0.5 to 7 parts by mass, and still more preferably from 0.7 to 3 parts by mass, on the basis of 100 parts by mass of the polyester resin (A), from the viewpoint of improving a hydrolysis resistance of the composition.

<Aliphatic Polycarbodiimide (C)>

The aliphatic polycarbodiimide (C) is a polycarbodiimide containing 2 or more carbodiimide groups each bonded to a carbon atom other than those carbon atoms present in an aromatic ring, in a molecule thereof.

The aliphatic polycarbodiimide may be synthesized, for example, by subjecting various organic diisocyanates to decarboxylation condensation reaction by using an organic phosphorus-based compound or an organic metal compound as a catalyst.

The degree of polymerization of the aliphatic polycarbodiimide is preferably from 2 to 20, and more preferably from 6 to 8, from the viewpoint of suppressing generation of a toxic gas.

Examples of the diisocyanates used for production of the aliphatic polycarbodiimide include at least one compound selected from the group consisting of hexamethylene diisocyanate, cyclohexane-1,4-diisocyanate, isophorone diisocyanate, 4,4'-dicyclohexylmethane diisocyanate, methyl cyclohexane diisocyanate, 1,3-bis(isocyanato-methyl)cyclohexane, xylylene diisocyanate and tetramethyl xylylene diisocyanate.

Of these compounds, from the viewpoint of effectively suppressing generation of a toxic gas, preferred is 4,4'-dicyclohexylmethane diisocyanate.

The amount of the aliphatic polycarbodiimide (C) used in the polyester resin composition is preferably from 0.1 to 10 parts by mass, more preferably from 0.5 to 7 parts by mass, and still more preferably from 0.7 to 3 parts by mass, on the basis of 100 parts by mass of the polyester resin (A), from the viewpoint of effectively exhibiting the effect of suppressing generation of a toxic gas.

<Additives>

The polyester resin composition of the present invention may also contain additives in addition to the polyester resin (A), the aromatic carbodiimide (B) and the aliphatic polycarbodiimide (C) unless the effects of the present invention are adversely affected by addition thereof.

Examples of the additives include an inorganic filler, a reinforcing material, a colorant (such as titanium oxide), a stabilizer (such as a radical scavenger and an antioxidant), a flame retardant (such as known metal hydrates, halogen-based flame retardants and phosphorus-based flame retardants), a known nucleating agent (such as talc), an antibacterial agent and a mildew-proof agent.

Specific examples of the inorganic filler usable in the present invention include silica, alumina, sand, clay and slag. Specific examples of the reinforcing material usable in the present invention include acicular inorganic substances and the like. Specific examples of the antibacterial agent usable in the present invention include a silver ion, a copper ion and a zeolite containing these ions.

<Applications>

The polyester resin composition of the present invention can be processed into molded articles used in the application fields such as electric and electronic equipments such as housings for electrical appliances, building materials, automobile parts, sundries, medical products, agricultural products, etc., by an injection molding method, a film forming method, a blow molding method, a foam molding method or the like.

<Mixing Means>

The means for mixing the respective components is not particularly limited, and these components may be mixed using known mixers, for example, a tumbler, a ribbon blender, a single-screw or twin-screw mixer, etc., or may be melted and mixed using an extruder, a roll, etc.

<Molding Method>

The method of molding the polyester resin composition of the present invention is not particularly limited, and there may be adopted any suitable molding methods that are necessary to produce ordinary electric and electronic equipments, including known molding methods such as an injection molding method, an injection compression molding method and a compression molding method. The temperature used upon melting and mixing or upon molding in these methods may be adjusted to not lower than a melting temperature of the polyester resin.

EXAMPLES

The present invention will be described in more detail below by referring to the following Examples and Comparative Examples. It should be noted, however, that the following Examples, etc., are only illustrative and not intended to limit the invention thereto.

Synthesis Example 1

Production of Aliphatic Polycarbodiimide

A reaction vessel equipped with a reflux condenser and a stirrer was charged with 100 parts by mass of 4,4'-dicyclohexylmethane diisocyanate and 0.5 part by mass of a carbodiimidation catalyst (3-methyl-1-phenyl-2-phospholene-1-oxide), and the contents of the reaction vessel were stirred at 185° C. in a nitrogen gas flow for 15 h, thereby obtaining an isocyanate-terminated poly-4,4'-dicyclohexylmethane carbodiimide.

As a result of subjecting the resulting reaction product to measurement of infrared (IR) absorption spectrum, it was confirmed that an absorption peak attributed to a carbodiimide group at a wavelength of about 2150 cm$^{-1}$ was observed. In addition, as a result of measurement of a percentage (%) of NCO in the reaction product, it was confirmed that the NCO percentage (%) was 4.88% (polymerization degree: 6.7).

Next, the resulting isocyanate-terminated poly-4,4'-dicyclohexylmethane carbodiimide was heated to 120° C., and then 40 parts by mass of polyethylene glycol monomethyl ether (average molecular weight: 400) was added thereto, and the resulting mixture was heated to 150° C. and reacted at that temperature for 5 h while stirring.

The resulting reaction mixture was subjected to measurement of infrared (IR) absorption spectrum, and after confirming dissipation of IR absorption of an isocyanate group at a wavelength of 2200 to 2300 cm$^{-1}$, the reaction product was taken out of the reaction vessel, and cooled to room temperature, thereby obtaining a light-yellow transparent viscous aliphatic polycarbodiimide.

Examples in which Components (A), (B) and (C) are Mixed at the Same Time

Example 1

One hundred parts by mass of a PET resin "TRN-8550FF" available from Teijin Chemicals Ltd., was melted at 270° C. using a Lab Mixer, and then 1 part by mass of the aliphatic polycarbodiimide obtained in Synthesis Example 1 and 1 part by mass of "STABAXOL 1LF" (aromatic monocarbodiimide) available from Rhein Chemie were added thereto at the same time, and the resulting mixture was mixed for 2.5 min.

After mixing the mixture for 2.5 min, the resulting resin mixture was immediately taken out of the mixer, and 250 mL of a gas generated therefrom was sampled and adsorbed by an adsorbent to subject the thus adsorbed substance to GC-MS analysis. The concentration of the decomposed gas was calculated from a peak of 2,6-diisopropyl phenyl isocyanate as a decomposed gas component observed at a retention time of 10.1 min. The results are shown in Table 1.

Examples 2 to 5

The same analyzing procedure as in Example 1 was repeated except for using the compounding ratios and conditions as shown in Table 1. The results are shown in Table 1.

Examples in which after Mixing Components (A) and (C), the Resulting Mixture is Mixed with Component (B)

Example 6

One hundred parts by mass of a PBS (polybutylene succinate) resin "BIONOLLE 1001MD" available from Showa Denko K.K., was melted at 270° C. using a Lab Mixer. Thereafter, 1 part by mass of the aliphatic polycarbodiimide obtained in Synthesis Example 1 was added to the melted PBS resin, followed by mixing the resulting mixture for 1 min (mixing time 1), and then 1 part by mass of "STABAXOL 1LF" (aromatic monocarbodiimide) available from Rhein Chemie was added thereto, followed by further mixing the resulting mixture for 2.5 min (mixing time 2).

After mixing the above mixture for 2.5 min, the resulting resin mixture was immediately taken out of the mixer, and 250 mL of a gas generated therefrom was sampled and adsorbed by an adsorbent to subject the thus adsorbed substance to GC-MS analysis. The concentration of the decomposed gas was calculated from a peak of 2,6-diisopropyl phenyl isocyanate as a decomposed gas component observed at a retention time of 10.1 min. The results are shown in Table 2.

Examples 7 and 8

The same analyzing procedure as in Example 6 was repeated except for using the compounding ratios and conditions as shown in Table 2. The results are shown in Table 2.

Comparative Example 1

One hundred parts by mass of a PET resin "TRN-8550FF" available from Teijin Chemicals Ltd., was melted at 270° C. using a Lab Mixer, and then 1 part by mass of "STABAXOL 1LF" (aromatic monocarbodiimide) available from Rhein Chemie was added thereto, and the resulting mixture was mixed for 2.5 min.

After mixing the above mixture for 2.5 min, the resulting resin mixture was immediately taken out of the mixer, and 250 mL of a gas generated therefrom was sampled and adsorbed by an adsorbent to subject the thus adsorbed substance to GC-MS analysis. The concentration of the decomposed gas was calculated from a peak of 2,6-diisopropyl phenyl isocyanate as a decomposed gas component observed at a retention time of 10.1 min. The results are shown in Table 1.

Comparative Examples 2 to 4

The same analyzing procedure as in Comparative Example 1 was repeated except for using the compounding ratios and conditions as shown in Table 1. The results are shown in Table 1.

TABLE 1

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| Polyester resin (A) | PET | PET | PBS | PHA | PLA | PET | PBS | PHA | PLA |
| Aromatic monocarbodiimide (B)*1 | 1 | 1 | 1 | 1 | 1 | 1 | 1 | 1 | 1 |
| Aliphatic polycarbodiimide (C)*1 | 1 | 0.7 | 1 | 1 | 1 | — | — | — | — |
| Mixing time [min] | 2.5 | 2.5 | 2.5 | 2.5 | 7 | 2.5 | 2.5 | 2.5 | 7 |
| Concentration of decomposed gas [μg/L] | 4.8 | 8.1 | 15.0 | 9.4 | 10.5 | 24.1 | 31.0 | 10.3 | 21.5 |

Note
*1 Compounding ratios [parts by mass] on the basis of 100 parts by mass of the component (A)

TABLE 2

|  | Examples | | |
| --- | --- | --- | --- |
|  | 6 | 7 | 8 |
| Polyester resin (A) | PBS | PHA | PLA |
| Aliphatic polycarbodiimide (C)*1 | 1 | 1 | 1 |
| Mixing time 1 [min] | 1 | 1 | 1 |
| Aromatic monocarbodiimide (B)*1 | 1 | 1 | 1 |
| Mixing time 2 [min] | 2.5 | 2.5 | 7 |
| Concentration of decomposed gas [μg/L] | 2.6 | >1.0 | 4.9 |

Note
*1 Compounding ratios [parts by mass] on the basis of 100 parts by mass of the component (A)

Regarding Symbols in Tables

PET: Polyethylene terephthalate "TRN-8550FF" available from Teijin Chemicals Ltd.

PBS: Polybutylene succinate "BIONOLLE 1001MD" available from Showa Denko K.K. (an ester-based resin produced from an aliphatic polycarboxylic acid and an aliphatic polyol)

PHA: Polyhydroxybutanoic acid "EM5400A" available from Ecomann Technology Co., Ltd. (an ester resin produced from 3-hydroxybutanoic acid)

PLA: Polylactic acid "Ingeo Biopolymer 4032D" available from Nature Works LLC

As is apparent from the results of the above Examples and Comparative Examples, according to the production process of the present invention, it is possible to effectively suppress generation of a highly toxic gas upon mixing a polyester resin and an aromatic carbodiimide.

The invention claimed is:

1. A process for producing a polyester resin composition, consisting of
   the step of mixing a polyester resin (A), an aromatic carbodiimide (B) and an aliphatic polycarbodiimide (C) at a temperature not lower than a melting temperature of the polyester resin,
   wherein after mixing the polyester resin (A) and the aliphatic polycarbodiimide (C), the resulting mixture is mixed with the aromatic carbodiimide (B),
   the polyester resin (A) is polybutylene succinate or a polyhydroxyalkanoic acid,
   the aromatic carbodiimide (B) is bis(diisopropylphenyl) carbodiimide,
   the aliphatic polycarbodiimide (C) is produced from 4,4'-dicyclohexylmethane diisocyanate, and
   a content of the aromatic carbodiimide (B) in the composition is from 0.7 to 3 parts by mass and a content of the aliphatic polycarbodiimide (C) in the composition is from 0.7 to 3 parts by mass respectively on the basis of 100 parts by mass of the polyester resin (A).

2. The process for producing a polyester resin composition according to claim 1, wherein the degree of polymerization of the aliphatic polycarbodiimide (C) is from 2 to 20.

3. The process for producing a polyester resin composition according to claim 1, wherein the degree of polymerization of the aliphatic polycarbodiimide (C) is from 6 to 8.

* * * * *